(12) United States Patent
Schlemmer et al.

(10) Patent No.: US 10,689,983 B2
(45) Date of Patent: Jun. 23, 2020

(54) PULSE BODY MODULE WITH BEARING PROTECTION

(71) Applicant: MTU Aero Engines AG, Munich (DE)

(72) Inventors: Markus Schlemmer, Mainburg / Sandelzhausen (DE); Andreas Hartung, Munich (DE); Gerhard-Heinz Roesele, Aichach (DE); Martin Pernleitner, Dachau (DE); Manfred Schill, Munich (DE); Manfred Feldmann, Eichenau (DE); Adrian Ehrenberg, Halmhausen (DE)

(73) Assignee: MTU Aero Engines AG, Munich (DE)

( * ) Notice: Subject to any disclaimer, the term of this patent is extended or adjusted under 35 U.S.C. 154(b) by 170 days.

(21) Appl. No.: 15/793,654

(22) Filed: Oct. 25, 2017

(65) Prior Publication Data
US 2018/0119552 A1    May 3, 2018

(30) Foreign Application Priority Data

Oct. 26, 2016  (DE) .......................... 10 2016 221 069

(51) Int. Cl.
*F01D 5/16* (2006.01)
*F01D 5/10* (2006.01)
(Continued)

(52) U.S. Cl.
CPC ................. *F01D 5/16* (2013.01); *F01D 5/10* (2013.01); *F01D 5/26* (2013.01); *F01D 25/06* (2013.01);
(Continued)

(58) Field of Classification Search
CPC ..... F01D 5/16; F01D 5/26; F01D 5/10; F01D 25/06; F05D 2230/234; F05D 2250/241;
(Continued)

(56) References Cited

U.S. PATENT DOCUMENTS

| 6,854,721 B2* | 2/2005 | Kato ....................... F16F 7/108 |
| | | 188/380 |
| 9,982,559 B2* | 5/2018 | Hartung .................... F01D 5/10 |
| 2002/0030315 A1* | 3/2002 | Kato ......................... F16F 7/10 |
| | | 267/141 |

FOREIGN PATENT DOCUMENTS

| DE | 102014223231 A1 | 6/2016 |
| EP | 2996110 A1 | 3/2016 |

(Continued)

*Primary Examiner* — Sizo B Vilakazi
(74) *Attorney, Agent, or Firm* — Barlow, Josephs & Holmes, Ltd.

(57) ABSTRACT

An impulse body module a turbine stage of a gas turbine includes a holder component of one-piece construction, with a base and surrounding side walls arranged at the base, wherein the side walls and the base define a holding chamber; an insert component, of one-piece construction, which is inserted into the holding chamber of the holder component, wherein the holder component and the insert component accommodated therein define a number of mutually separated cavities, and wherein an impulse body, in particular a sphere, is accommodated in each cavity; and a closure component of one-piece construction, which is joined to the holder component in a material-bonded manner where the holding chamber is closed and the insert component is surrounded by the holder component and the closure component. The holder component has at least one base projection in the region of its base, which extends away from the holding chamber.

14 Claims, 4 Drawing Sheets

(51) Int. Cl.
*F01D 5/26* (2006.01)
*F01D 25/06* (2006.01)
*F16F 15/10* (2006.01)

(52) U.S. Cl.
CPC .... *F05D 2230/234* (2013.01); *F05D 2230/30* (2013.01); *F05D 2230/31* (2013.01); *F05D 2250/241* (2013.01); *F05D 2260/96* (2013.01); *F05D 2260/963* (2013.01); *F16F 15/10* (2013.01)

(58) Field of Classification Search
CPC ........... F05D 2260/96; F05D 2260/963; F05D 2230/31; F05D 2230/30; F16F 15/10
See application file for complete search history.

(56) References Cited

FOREIGN PATENT DOCUMENTS

| | | |
|---|---|---|
| EP | 3020922 A1 | 5/2016 |
| EP | 3023584 A1 | 5/2016 |
| EP | 3138996 A1 | 3/2017 |
| WO | 2012095067 A1 | 7/2012 |

\* cited by examiner

PULSE BODY MODULE WITH BEARING PROTECTION

BACKGROUND OF THE INVENTION

The present invention relates to an impulse body module for a turbomachine, in particular a turbine stage of a gas turbine, comprising; a holder component of one-piece construction with a base and surrounding side walls arranged at the base, wherein the side walls and the base define a holding chamber; an insert component of one-piece construction, which is inserted into the holding chamber of the holder component, wherein the holder component and the insert component accommodated therein are constructed in such a way that together they define a plurality of mutually separated cavities, and wherein, in each cavity, an impulse body, in particular a sphere, is accommodated; and a closure component of one-piece construction, which is joined to the holder component in a material-bonded manner in such a way that the holding chamber is closed and the insert component is surrounded by the holder component and the closure component. Coming into consideration as methods for creating the material-bonding or substance-bonding, for example, are additive methods, such as, in particular, laser melting methods, in addition to conventional welding.

Blade or vane arrangements, in particular rotating blade arrangements, of gas turbines tend to undergo oscillations because of their elasticity and excitation due to the operating fluid or gas flowing around them and due to vibrations. Natural frequencies of the blades can thereby be excited, wherein the resonances that hereby result can lead to damage to the gas turbine and, in particular, to the blade arrangement.

For damping and, in particular, for so-called detuning of oscillations or vibrations, the applicant has proposed, in place of hitherto conventional dissipative frictional dampers, a concept disclosed in WO 2012/095067 A1, in which impulse bodies in a rotating blade influence the vibrations through impact contacts, in particular when the frequency attains nearly the natural frequency.

The applicant has further elaborated concepts for housings, in which a plurality of impulse bodies are accommodated, and the housing, together with the impulse bodies, is fastened in place in a corresponding installation space of a rotating blade arrangement. In this connection, reference is made to an earlier application DE 102016207874.7, in particular, which had not yet been published on the date of filing of the present application.

SUMMARY OF THE INVENTION

Starting from known impulse body modules, the object of the invention is to further develop an impulse body module such that its installation is simplified and its positional securing can be improved.

For achieving this object, it is proposed that the holder component has at least one base projection in the region of its base or of its closure component, said base projection extending away from the holding chamber. By means of such a base projection, the impulse body module can be impeded from falling out of its installed position. Furthermore, such a base projection can also be effective against twisting.

The base projection can hereby be arranged along a short side wall of the holder component. The impulse body module, conceptually excluding the base projection, can hereby be essentially cubic in design with an essentially rectangular base surface. Accordingly, the base projection covers only a part of the base surface of the impulse body module or of the base or the closure component.

Furthermore, the base projection can be essentially cubic in shape, preferably with rounded corner regions in the transition to the base or to the closure component and in the transition to its free end. Alternatively, the corner regions can also be designed as inclined surface portions or beveled edges. Such corner regions simplify, in particular, the introduction of the impulse body module into a corresponding depression at a blade arrangement.

The impulse body module can have two equivalently or differently formed base projections in the region of two corners of the holder component, between which a clearance is provided. For this purpose, it is further proposed that the one base projection, starting from the base or from the closure component, has a greater height than the other base projection. Furthermore, the one base projection can have a smaller cross-sectional surface area than the other base projection. Through embodiments of this kind, it is possible to obtain a distinct installed position of the impulse body module in a correspondingly formed, in particular complementarily formed depression.

Alternatively to an arrangement in the region of a lateral surface, the base projection can also be provided in a central region of the base or of the closure component.

It is further proposed that the base projection has a shape that is complementary in form to a depression in a blade arrangement of a turbine stage. A cross-sectional surface of the base projection can be essentially triangular or rectangular or polygonal in shape. Preferably, the cross-sectional surface has rounded corner regions.

For the impulse body module, the holder component including the base projection, the insert component, and the closure component can be produced by an additive method, in particular by a selective laser melting method.

Alternatively or additionally, it is also possible to conceive of the holder component, including the base projection, or/and the insert component or/and the closure component as being produced, at least in part, by a material-removing fabrication method, such as, for example, electrochemical ablation, or by a metal injection molding method. A material-removing method can, if need be, also be employed in addition or subsequent to an additive method, for instance for smoothing the outer contour of the impulse body module.

In accordance with another aspect, the invention also relates to a method for producing an impulse body module for a turbomachine, in particular for a turbine stage of a gas turbine, comprising the steps:

Production of the holder component through layer-by-layer buildup by means of an additive manufacturing method, in particular by means of a selective laser melting method, wherein the holder component has a base with at least one base projection and surrounding side walls arranged at the base, wherein the base is built up starting from the at least one base projection and wherein the side walls are built up starting from the base in such a way that a holding chamber is formed inside the side walls;

Production of at least one insert component, at least portions of which are latticed, through layer-by-layer buildup by means of an additive manufacturing method, in particular by means of a selective laser melting method;

Insertion of the insert component into the holding chamber of the holder component, wherein, prior to the insertion or during the insertion, impulse bodies, in particular spheres, are inserted into the cavities that are formed jointly by the holder component and the insert component;

Layer-by-layer buildup on the holder component, together with an inserted insert component, of a closure component by means of an additive manufacturing method, in particular by means of a selective laser melting method, so that the holder component and the closure component are joined to each other in a material-bonded manner and form a one-piece encasement for the insert component and the incorporated impulse bodies.

The invention also relates to a blade arrangement of a compressor stage or of a turbine stage of a gas turbine, wherein the blade arrangement has a depression, into which an above-described impulse body module is inserted, wherein the depression is preferably provided in the region of a rotating blade root or in the region of a guide-vane root.

BRIEF DESCRIPTION OF THE DRAWING FIGURES

Finally, the invention also relates to a gas turbine, in particular an aircraft gas turbine, comprising a plurality of compressor stages and a plurality of turbine stages, wherein said gas turbine has at least one above-described impulse body module that is associated with a compressor stage or a turbine stage.

The invention will be described below with reference to the appended figures by way of example and with no limitation.

DESCRIPTION OF THE INVENTION

Figure 1A:
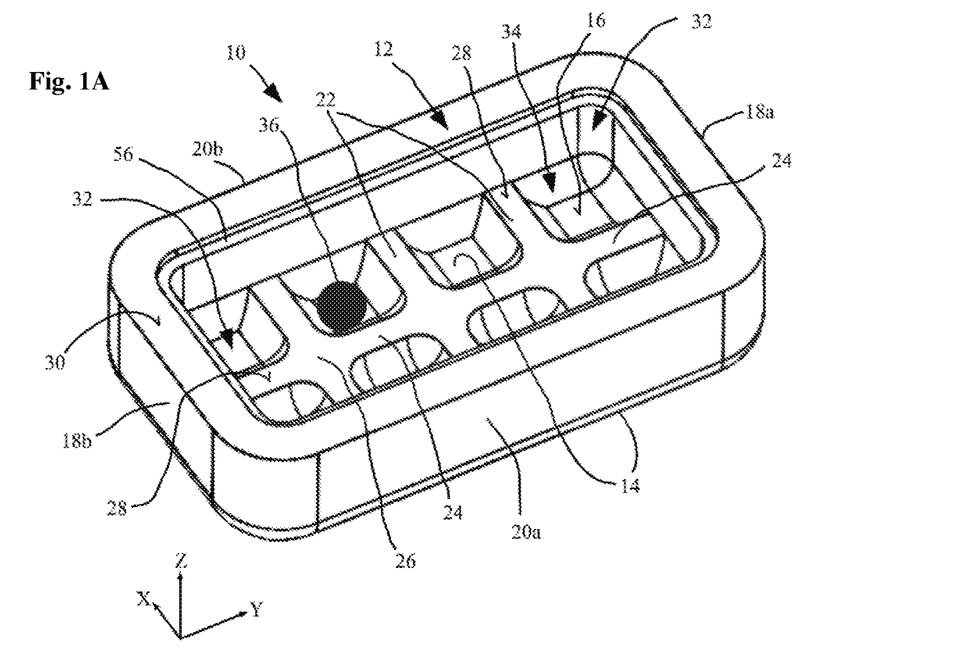
FIG. 1A shows a holder component of a known impulse body module in a perspective view and in a plan view in FIG. 1B.
Figure 1B:
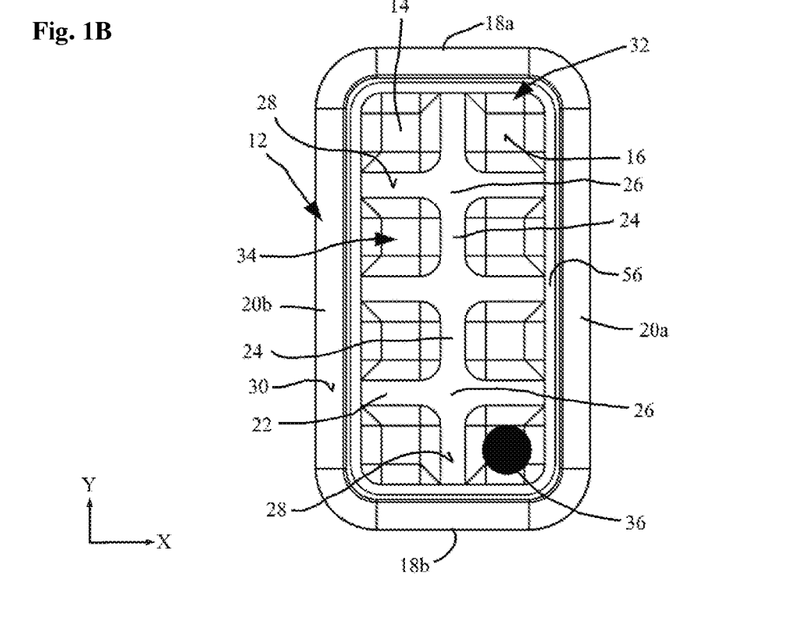

A known impulse body module, which illustrates the principle for the invention described in the scope of this application, is described with reference to FIGS. 1 to 4. The following statements with reference to FIG. 1A also apply to FIG. 1B. FIG. 1A shows, in a perspective illustration, a holder component 12 of an impulse body module 10, which is illustrated in its ready-to-use state in FIG. 4. The holder component 12 is constructed in one piece and has a base 14, which may also be referred to as a bottom. The base 14 has a visible inner surface 16 and a non-visible outer surface in FIGS. 1 to 4. The side walls 18a, 18b and 20a, 20b are joined to the base 14. The side walls 20a, 20b may be referred to as lengthwise walls and the side walls 18a, 18b may be referred to as transverse walls. In the plan view, the holder component 12 is essentially rectangular in shape, wherein the corners can have a rounded or chamfered form. For FIG. 1 and all other figures, the coordinate system illustrated in FIG. 1 is used, in which the X direction corresponds to the transverse direction, the Y direction corresponds to the lengthwise direction, and the Z direction (orthogonal to the X direction and Y direction) corresponds to a height direction. This coordinate system applies correspondingly also to all other figures.

Figure 2:
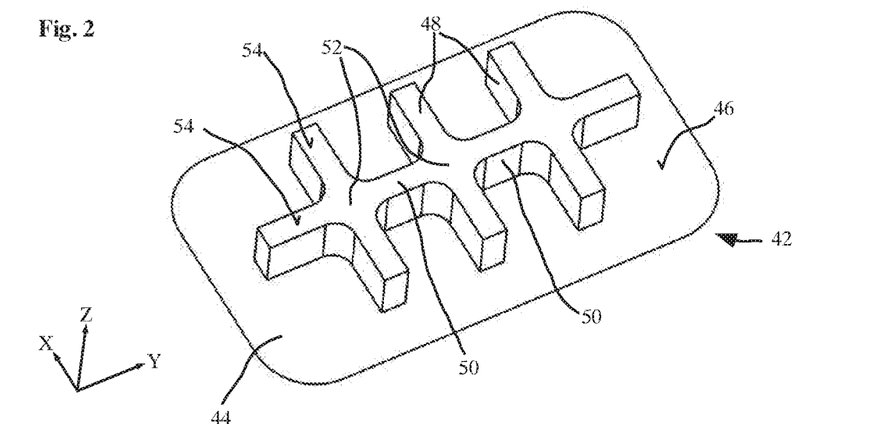
FIG. 2 shows an insert component for the holder component of FIG. 1 in a perspective illustration.

Provided at the base 14 are a plurality of struts 22, 24, which project upwards from the inner surface 16, which corresponds to a direction orthogonal to the plane of the drawing in FIG. 2. The struts 22, 24 may also be referred to as ribs. The struts 24 run in the lengthwise direction and may correspondingly also be referred to as lengthwise struts. The struts 22 run in the transverse direction and may correspondingly also be referred to a transverse struts. The lengthwise struts 24 and the transverse struts 22 cross one another in a plurality of crossing regions 26. The view in FIG. 2 is onto the respective end faces 28 of the lengthwise struts 22 and of the transverse struts 24. The end faces 28 are situated at a height or at a level that lies lower than the visible front edge 30 of the side walls 18a, 18b, 20a, 20b. The base 14 and the side walls 18a, 18b, 20a, 20b define a holding chamber 32. The lengthwise struts 24 and the transverse struts 22 result in the formation of a plurality of cavities 34 or volume parts of cavities 34 in the holding chamber 32. The lengthwise struts 24 and the transverse struts, together with the base 14 and the lateral surfaces 18a, 18b, 20a, 20b, result in the formation of individual compartments or sub-compartments. The cavities 34 serve for holding a respective impulse body 36, which can be formed, in particular, as a sphere. Shown in FIGS. 1A and 1B is only one impulse body 26 in a cavity 34 by way of example in each case. In point of fact, however, the finished component has an impulse body, preferably in the form of a sphere, in each of the eight cavities 34 in this exemplary embodiment.

FIG. 2 shows, in a perspective illustration, an insert component 42 of one-piece construction, which can be inserted into the holder component 12, in particular into the holding chamber 32 thereof, or is inserted in the ready-to-use state. In the first embodiment, the insert component has an end wall 44. The view in FIG. 2 is onto the inner side 46 of the end wall 44, wherein this inner side 46 faces the inner surface 16 of the base 14 in the assembled state. The insert component 42 likewise has a plurality of struts 48, 50, which are arranged at the end wall 44. The struts 48 form transverse struts and the struts 50 form lengthwise struts. The lengthwise struts 50 and the transverse struts 48 cross in crossing regions 52. The lengthwise struts 50 and the transverse struts 48 have a front side 54. If the insert component 42 is inserted into the holder component 12 (FIGS. 1A, 1B), the respective front sides 54 lie on the end faces 28. As a result of this, the cavities 34, illustrated in FIGS. 1A, 1B, are closed. An individual cavity 34 is then defined by the base 14, the struts 22, 24, and the side walls 18a, 18b, 20a, 20b of the holder component as well as by the end wall 44 and the struts 48, 50 of the insert component 42. The end wall 42 hereby lies, with its inner side 46, on a surrounding inner edge 56 of the holder component 12. Furthermore, the end wall 44 has a peripheral contour that is complementary to the inner periphery of the mounting opening 32. Expressed differently, the holding chamber 32 is covered or closed in a form-fitting manner by the insertion of the insert component 42 into the holder component 12, so that impulse bodies 36 that are accommodated in the cavities 34 can still move only inside their respective cavity 34.

Figure 3:
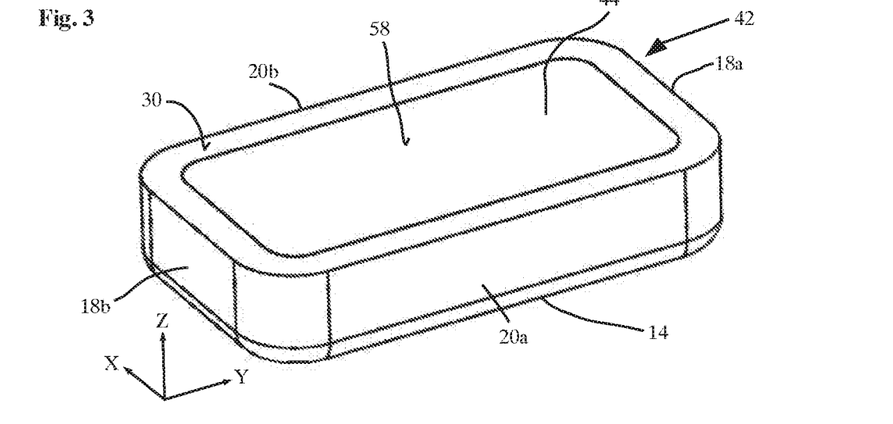
FIG. 3 shows the holder component of FIG. 1 with the inserted insert component of FIG. 2 in a perspective illustration.

FIG. 3 shows, in a perspective illustration, the state when the insert component 42 is inserted into the holder component 12. It can be seen further from this illustration that an outer surface 58 of the end wall 44 terminates essentially flush with the front edge 30 of the surrounding side walls

18a, 18b, 20a, 20b. In this state, the front edge 30 and the end wall 44 form an essentially continuous plane or surface.

Figure 4:
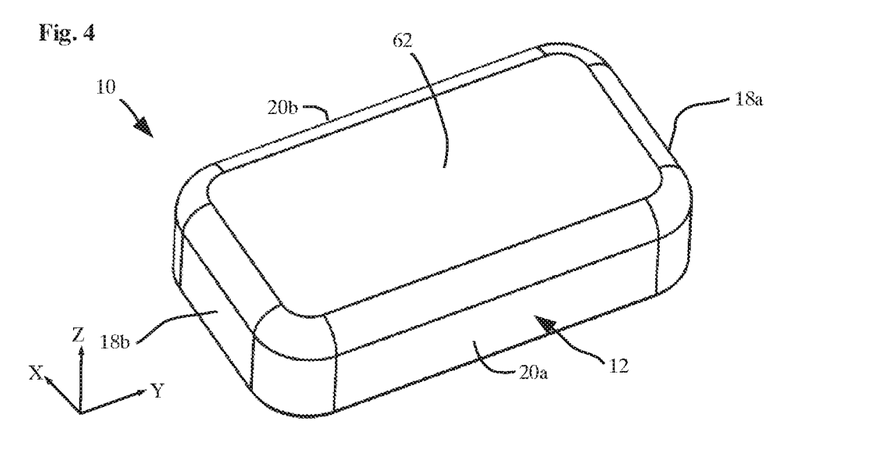
FIG. 4 shows the holder component closed by means of a closure component.

FIG. 4 shows, in a perspective illustration, the finished impulse body module 10, wherein the holder component 12, together with the inserted insert component 42 (see FIG. 3) and the impulse bodies (36) (FIGS. 1A, 1B) accommodated in the cavities 34 (FIGS. 1A, 1B), is closed by a closure component 62. The closure component 62 may also be referred to as a cover. The closure component 62 is joined at least to the side walls 18a, 18b, 20a, 20b of the holder component 12 in a material-bonded manner. However, it can also additionally be joined to the end wall 44 (FIG. 3) of the insert component 42 in a material-bonded manner.

Now that the already known principle for the construction of an impulse body module has been presented with reference to FIGS. 1 to 4, two embodiments of the present invention will be discussed in detail on the basis of FIGS. 5A, 5B and FIGS. 6A, 6B.

Figure 5A:
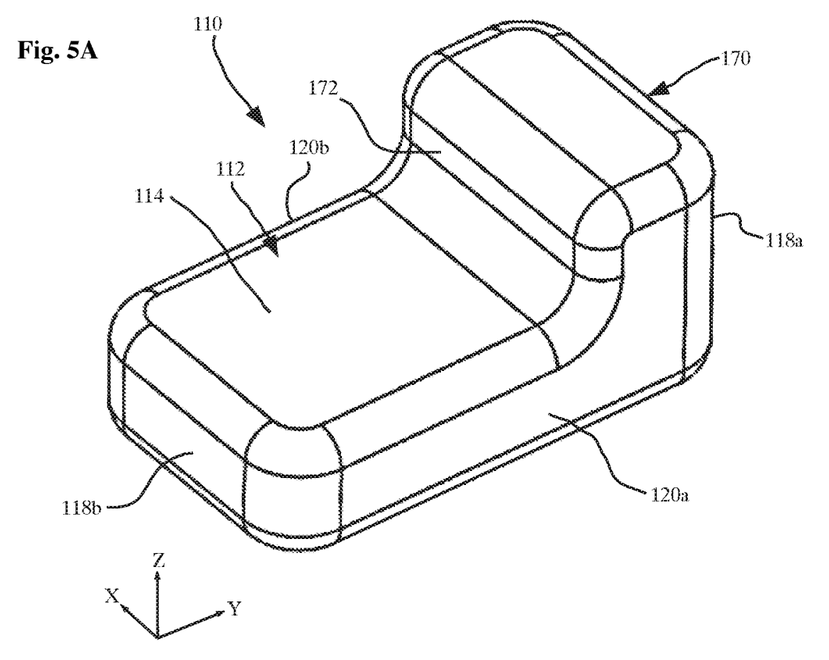
FIGS. 5A and 5B show top and bottom perspective views, respectively, of an embodiment of an impulse body module with a base projection.

Illustrated in FIG. 5A) is an impulse body module 110 in a perspective view onto the holder component 112 together with the base 114. The impulse body module 110 has a base projection 170 at its base 114. The base projection 170 is formed along a short side wall 118a. The base projection 170 extends only partially in the region of the long side walls 120a, 120b. The base projection 170 is preferably constructed in one piece with the base 114. Whereas the base projection 170 forms an extension in the Z direction in the region of the side walls 118a, 120a, 120b, it has a transition wall 172 in the region of the base 114. In other words, it can be stated that the impulse body module 110, together with the base projection 170, is essentially L-shaped. The base projection 170 has a front surface 176. The front surface 176 forms a free end of the base projection 170. The base projection 170 serves, in particular, for the purpose of being accommodated in a correspondingly formed depression, in particular in a form-fitting manner, so that the impulse body module 110 can be secured against falling out or/and against twisting. Accordingly, the base projection 170 serves for positional securing of the impulse body module 110 during installation or in the installed state.

Figure 5B:
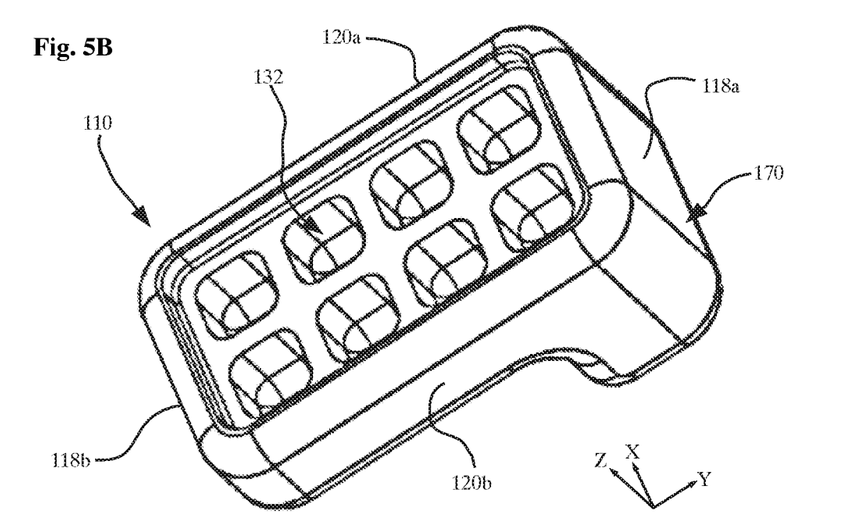

Illustrated in FIG. 5B) is the impulse body module 110 in a perspective view onto the holding chamber 132. It can be seen from FIG. 5B) that the construction in the interior of the impulse body module is essentially identical to the construction of the impulse body module 10, which was described in detail with reference to FIGS. 1 and 2. This description can also be applied correspondingly to this embodiment of the impulse body module 110, without it being necessary to repeat it here once again. It can further be seen from FIG. 5B) that the base projection 170 extends along the Z direction away from the holding chamber 132.

Figure 6A:
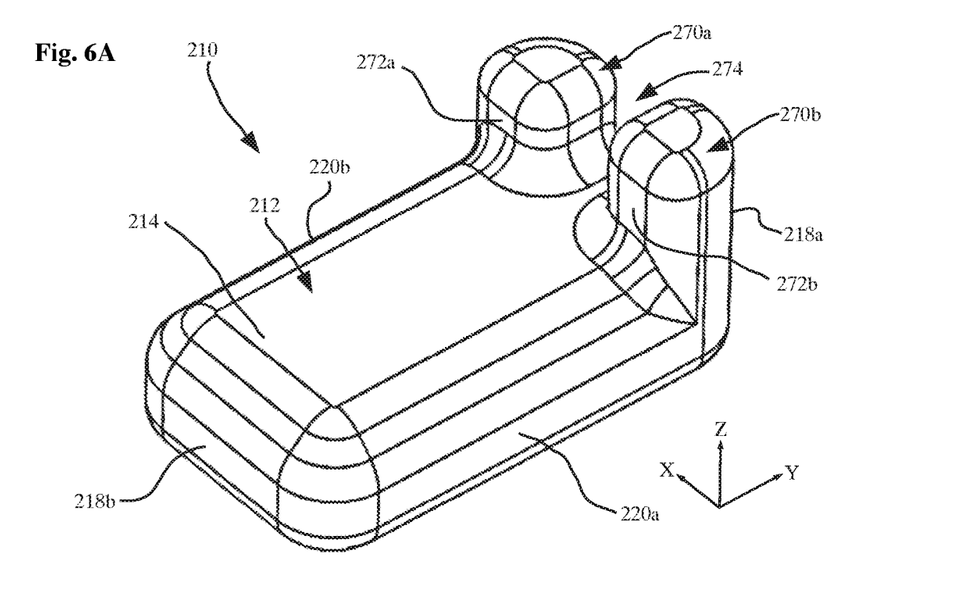
FIGS. 6A and 6B show top and bottom perspective views, respectively, of an embodiment of an impulse body module with two base projections.
Figure 6B:
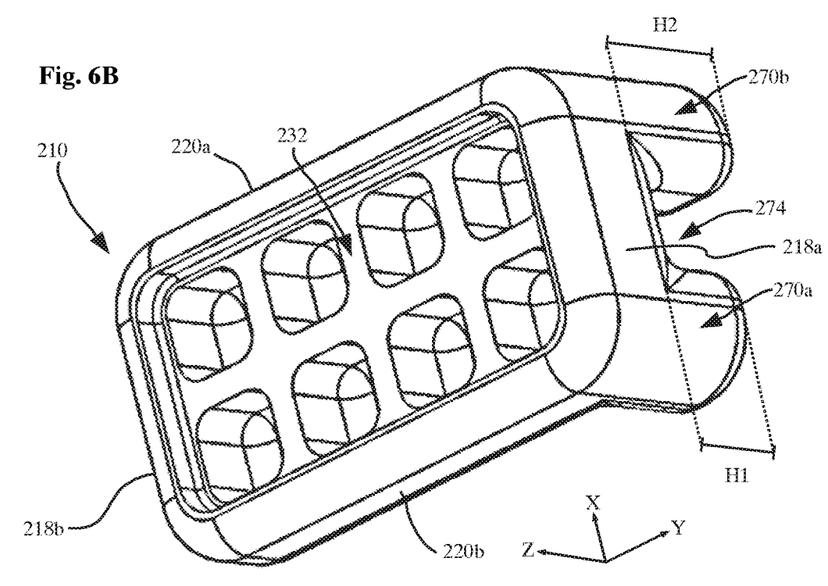

Illustrated in FIG. 6A) is an impulse body module 210 in a perspective view onto the holder component 212 together with the base 214. At its base 214, the impulse body module 210 has two base projections 270a, 270b. The base projections 270a, 270b are arranged in the corner regions of the impulse body module 210 or of the base 214. Formed between the two base projections 270a, 270b is a gap or intermediate space 274. In relation to the Z direction, the base projection, starting from the base 214, has a smaller extension or height H1 than the base projection 270b, which has a height H2 (FIG. 5B). It can further be seen from FIG. 6A) that the shorter base projection 270a has a circumference, measured orthogonally to the Z direction, that is greater than the circumference of the other base projection 270b. In other words, the base projection 270a has a larger maximum cross-sectional surface than the base projection 270b. The base projections 270a, 270b are therefore differently dimensioned, even though they have a similar outer contouring. The base projections 270a, 270b form an extension in the Z direction in the region of the side walls 218a, 220a, 220b. In the region of the base 114, they have a respective transition wall 272a, 272b. In other words, it can be stated also that the impulse body module 210 is essentially L-shaped in the region of the two base projections 270a, 270b. The base projections 270a, 270b form a respective front surface 276a, 276b. The front surfaces 276a, 276b each form a respective free end of the associated base projection 270a, 270b. The base projections 270a, 270b likewise serve for the purpose of being accommodated in a correspondingly formed depression, in particular in a form-fitting matter, so that the impulse body module 210 can be secured against falling out or/and against twisting. Accordingly, the base projections 270 serve for positional securing of the impulse body module 210 during installation or in the installed state.

The known impulse body module 10 presented in FIGS. 1 to 4 and the impulse body modules 110, 210 of FIGS. 5A, 5B and FIGS. 6A, 6B augmented with at least one base projection 170, 270a, 270b, particularly also together with the respective one-piece components, namely, the holder component 112, the insert component 42, and the closure component 62, are preferably produced by means of an additive manufacturing method, in particular a selective laser melting method. In the process, the layer-by-layer buildup of the holder component 12 occurs beginning with a first layer of the base 14 (FIGS. 1A, 1B) or of the base projection 170 (FIGS. 5A, 5B) or of the longer base projection 270b (FIGS. 6A, 6B) in the height direction or Z direction. The insert piece 42 is built up layer by layer, starting from a first layer of the end wall 44 in the height direction or Z direction (FIG. 2). When the one-piece insert component 42 is inserted into the mounting opening 32 of the holder component 12, the impulse bodies 36 are inserted into the respective cavities 34. Starting from a state in accordance with FIG. 3, the closure component 62 is produced layer by layer on the impulse body module 10, which is not yet quite finished, by means of the additive method, in particular by means of the selective laser melting method. In the process, a first powder layer is applied onto the continuous surface or plane (FIG. 3) that is formed by the front edge 30 and the outer side 58 of the end wall 44 and then joined to it in a material-bonded manner. The impulse body module 10, 110, 210, produced in this way, thus has a simply produced and stress-free closed structure. In particular, no undesired stresses arise either, such as those that can occur in the case of conventional covers, employed, for instance, by form-fitting connection (locking connection or the like). Because, for all three components, namely, the holder component 12, the insert component 42, and the closure component 62, the same material is used and the same production method is employed, there results a homogeneously constructed impulse body module, in which the individual components have identical (material) properties.

Through this kind of production of the impulse body module 10, 110, 210, it can be ensured that the impulse bodies 36 are enclosed in their cavities 34 in an airtight manner and no gas can penetrate to them from the outside. This is of importance particularly in the case when the impulse body module 10, 110, 210 is intended to be used in the hot-gas region of turbomachines, that is, for example, at a blade arrangement in the turbine region of the turbomachine. The airtight enclosure of the impulse bodies 36 in the cavities 34 results in their protection against wear due to hot-gas oxidation and/or sulfidation.

Furthermore, the production route described above makes it possible to produce a large number of units at lower costs. The impulse body modules 10, 110, 210 are relatively small. Thus, the dimension of their longest side, that is, the side in the lengthwise direction or Y direction, is, in practice, depending on the field of application, at most a few centimeters, preferably smaller than two centimeters, more preferably between one and 1.5 centimeters. The base projection 170, 270a, 270b (FIG. 5, 6) protrudes about 1 to 10 millimeters over the outer surface of the base 114, 214. Accordingly, the installation space of a commercially available SLM machine offers, as a rule, sufficient space to be able to produce in parallel several hundred holder components 12 and several hundred insert pieces 42.

Preferred materials for the production of the holder components 12, the insert components 42, and the closure components 62 can be the following: Haynes 230, Inco 718, Hastelloy X, MARM 247, MARM 247 LLDS, MARM 509. Besides these preferred materials, other materials also suitable for additive manufacturing methods can be used.

It is noted that the embodiments of impulse body modules 110, 210 with one or a plurality of base projections 170, 270a, 270b, which are presented here, are not limited to the illustrated designs. It is also conceivable, for example, that a base projection is not provided in the region of the side walls, but rather in a central region of the base. It is also possible to alter the shape of the cross-sectional surface area (cut in the X-Y plane) of the base projections 170, 270a, 270b. It is conceivable, for example, that the cross-sectional surface area corresponds to a triangle or a polygon, preferably with rounded or chamfered corner regions, depending on the base projection 170 (FIGS. 5A, 5B) presented here with a rectangular cross-sectional surface area or, depending on the base projections 270a, 270b, with a cross-sectional surface that corresponds, for instance, to a quarter circle (pie piece).

What is claimed is:

1. An impulse body module for a turbomachine, in particular a turbine stage of a gas turbine, comprising:
    a holder component of one-piece construction, with a base and surrounding side walls arranged at the base, wherein the side walls and the base define a holding chamber,
    an insert component of one-piece construction, which is inserted into the holding chamber of the holder component, wherein the holder component and the insert component accommodated therein are constructed in such a way that they together define a plurality of mutually separated cavities and wherein an impulse body, in particular a sphere, is accommodated in each cavity, and
    a closure component of one-piece construction, which is joined to the holder component in a material-bonded manner in such a way that the holding chamber is closed and the insert component is surrounded by the holder component and the closure component,
    wherein the holder component has at least one base projection in the region of its base or of the closure component, which extends away from the holding chamber.

2. The impulse body module according to claim 1, wherein the base projection is arranged along a short side wall of the holder component.

3. The impulse body module according to claim 1, wherein the base projection is substantially cubic in shape, with rounded corner regions at the transition to the base or to the closure component and at the transition to its free end.

4. The impulse body module according to claim 1, wherein two equivalently or differently constructed base projections are located in the region of two corners of the holder component, between which a gap is provided.

5. The impulse body module according to claim 4, wherein the one base projection, starting from the base or from the closure component, has a greater height than the other base projection.

6. The impulse body module according to claim 4, wherein the one base projection has a smaller cross-sectional surface than the other base projection.

7. The impulse body module according to claim 1, wherein the base projection is located in a central region of the base or of the closure component.

8. The impulse body module according to claim 1, wherein a cross-sectional surface of the base projection is substantially triangular or rectangular or polygonal in shape.

9. The impulse body module according to claim 1, wherein the holder component, together with the base projection, the insert component, and the closure component, is produced by an additive method.

10. The impulse body module according to claim 1, wherein the holder component together with the base projection or/and the insert component or/and the closure component are produced at least in part by a material-removing manufacturing method.

11. A method for producing an impulse body module for a turbomachine, comprising the steps of:
    forming a holder component through layer-by-layer buildup by an additive manufacturing method wherein the holder component has a base with at least one base projection and surrounding side walls arranged at the base, wherein the base is built up starting from the at least one base projection and wherein the side walls are built up starting from the base in such a way that a holding chamber is formed inside the side walls;
    forming at least one insert component, at least sections of which are latticed, through layer-by-layer buildup by means of an additive manufacturing method;
    inserting the insert component into the holding chamber of the holder component, wherein, prior to the insertion or during the insertion, impulse bodies are inserted into cavities that are formed jointly by the holder component and the insert component;
    building up layer-by-layer on the holder component, together with the inserted insert component, of a closure component by means of an additive manufacturing method so that the holder component and the closure component are joined to each other in a material-bonded manner and form a one-piece encasement for the insert component and the incorporated impulse bodies.

12. The impulse body module according to claim 1, further comprising a blade arrangement of a compressor stage or of a turbine stage of a gas turbine having a depression, in which the impulse body module is inserted, wherein the depression is provided in a region of the rotating blade root or in a region of the guide-vane root.

13. The impulse body module according to claim 12, wherein the base projection has a form that is complementary to a depression in the blade arrangement.

14. The impulse body module according to claim 1, wherein at least one impulse body module is provided in a gas turbine that comprises a plurality of compressor stages and a plurality of turbine stages, and is associated with a compressor stage or a turbine stage.

\* \* \* \* \*